(12) United States Patent
Parsons

(10) Patent No.: US 7,685,762 B2
(45) Date of Patent: Mar. 30, 2010

(54) DEVICE FOR REDUCING THE CATCH OF UNWANTED SPECIES IN FISHING TRAWLS

(75) Inventor: Glenn Ray Parsons, Oxford, MS (US)

(73) Assignee: Glenn R. Parsons, Oxford, MS (US)

( * ) Notice: Subject to any disclaimer, the term of this patent is extended or adjusted under 35 U.S.C. 154(b) by 228 days.

(21) Appl. No.: 11/956,509

(22) Filed: Dec. 14, 2007

(65) Prior Publication Data

US 2009/0151219 A1 Jun. 18, 2009

(51) Int. Cl.
*A01K 73/02* (2006.01)
*A01K 73/00* (2006.01)

(52) U.S. Cl. .......................................... 43/9.2; 43/9.1

(58) Field of Classification Search .............. 43/9.2, 43/9.1
See application file for complete search history.

(56) References Cited

U.S. PATENT DOCUMENTS

| | | | | |
|---|---|---|---|---|
| 2,721,411 A | * | 10/1955 | Pedersen | 43/9.1 |
| 2,890,543 A | * | 6/1959 | Mitchell | 43/9.1 |
| 2,948,980 A | * | 8/1960 | Worcester | 43/9.1 |
| 2,985,974 A | * | 5/1961 | Worcester | 43/9.1 |
| 3,156,996 A | * | 11/1964 | Luketa | 43/9.1 |
| 3,195,261 A | * | 7/1965 | Luketa | 43/9.3 |
| 3,440,752 A | * | 4/1969 | Minter | 43/9.2 |
| 3,461,591 A | * | 8/1969 | Brown et al. | 43/9.1 |
| 3,475,846 A | * | 11/1969 | Springston, Jr. | 43/9.1 |
| 4,089,131 A | * | 5/1978 | Phillips | 43/4 |
| 4,399,629 A | * | 8/1983 | Duncan | 43/4 |
| 4,402,154 A | * | 9/1983 | Pence | 43/9.2 |
| 4,558,534 A | * | 12/1985 | Phillips | 43/9.1 |
| 4,646,577 A | * | 3/1987 | Phillips | 73/863.23 |
| 4,739,574 A | * | 4/1988 | Saunders | 43/9.2 |
| 4,805,335 A | * | 2/1989 | West et al. | 43/9.2 |
| 4,869,010 A | * | 9/1989 | Saunders, Sr. | 43/9.2 |
| 4,965,955 A | * | 10/1990 | Campbell et al. | 43/4 |
| 5,076,000 A | * | 12/1991 | Anthony | 43/9.2 |
| 5,123,195 A | * | 6/1992 | Hawkins | 43/9.2 |
| 5,215,197 A | | 6/1993 | Harvey | |
| 5,222,318 A | * | 6/1993 | Stokes et al. | 43/9.2 |
| 5,325,619 A | * | 7/1994 | Paul | 43/9.2 |

(Continued)

FOREIGN PATENT DOCUMENTS

DE 3440696 A1 * 5/1986

(Continued)

*Primary Examiner*—Darren W Ark

(57) ABSTRACT

A device for reducing the catch of unwanted species of organisms in fishing trawls which allows the retention of shrimp and the escape of fish from the trawl. The device features a longer, smaller diameter cylinder nested within a shorter, larger diameter cylinder in such a way as to create a continuous escape opening around the entire circumference of the net. The trawl bag is attached to the downstream end of the outer cylinder and the trawl body is attached to the upstream end of the inner cylinder. Flow blocking plates, set at an approximate 45° angle ahead of the escape opening, create an area of reduced water flow in and around the escape opening. Fish naturally move into the slower water flow and into the escape opening. Fish then move out of the trawl. Shrimp, being weaker in their swimming abilities are unable to move into the slower water areas and are therefore carried into the trawl bag and are captured.

10 Claims, 4 Drawing Sheets

U.S. PATENT DOCUMENTS

| | | | |
|---|---|---|---|
| 5,575,102 A * | 11/1996 | Coulon | 43/9.2 |
| 5,578,768 A * | 11/1996 | Phillips | 73/863.23 |
| 5,722,196 A * | 3/1998 | Flynn | 43/9.1 |
| 6,112,699 A * | 9/2000 | Saxby et al. | 43/9.1 |
| 6,223,462 B1 * | 5/2001 | Johannesson | 43/9.2 |
| 6,343,433 B1 * | 2/2002 | Granberg | 43/9.2 |
| 2006/0225336 A1 * | 10/2006 | Redfearn | 43/9.2 |

FOREIGN PATENT DOCUMENTS

| | | |
|---|---|---|
| FR | 2735329 A1 * | 12/1996 |
| JP | 58019534 A * | 2/1983 |
| JP | 60205233 A * | 10/1985 |
| JP | 2005110633 A * | 4/2005 |
| JP | 2008054591 A * | 3/2008 |
| WO | WO/92/17999 | 10/1992 |
| WO | WO 9217999 A1 * | 10/1992 |
| WO | WO 9825452 A1 * | 6/1998 |
| WO | WO/98/36638 | 8/1998 |
| WO | WO 9836638 A1 * | 8/1998 |
| WO | WO/02/28169 | 4/2002 |
| WO | WO 02/28169 A2 * | 4/2002 |
| WO | WO 2004032616 A1 * | 4/2004 |

* cited by examiner ic DEVICE FOR REDUCING THE CATCH OF UNWANTED SPECIES IN FISHING TRAWLS

CROSS REFERENCE TO RELATED APPLICATIONS

U.S. Patent Documents

| | | |
|---|---|---|
| 3,195,261 | July 1965 | Luketa |
| 3,440,752 | April 1969 | Minter |
| 4,739,574 | April 1988 | Saunders |
| 4,805,335 | February 1989 | West, et al. |
| 4,869,010 | September 1989 | Saunders |
| 5,076,000 | December 1991 | Anthony |
| 5,123,195 | June 1992 | Hawkins |
| 5,215,197 | June 1993 | Harvey |
| 5,222,318 | June 1993 | Stokes, et al. |
| 5,325,619 | July 1994 | Paul |
| 5,575,102 | November 1996 | Coulon |
| 6,223,462 | May 2001 | Johannesson |

Foreign Patent Documents

| | | |
|---|---|---|
| WO 92/17999 | October 1992 | Larsen |
| WO 98/36638 | August 1998 | Thomsen |
| WO 02/28169 | May 2002 | Marsel |

STATEMENT REGARDING FEDERALLY SPONSORED RESEARCH OR DEVELOPMENT

Not Applicable

REFERENCE TO SEQUENCE LISTING

Not Applicable

BACKGROUND OF THE INVENTION

The invention described in this document concerns a device that is placed in a fishing trawl that allows the escape of unwanted species during trawling. The device is placed in the trawl just ahead of the trawl bag.

A fishing trawl is basically a large net that is towed by a fishing vessel, along the bottom of the ocean and captures any organism that is unable to get out of its path. The trawl has a large opening on one end and, like a large funnel, narrows to a bag on the other end where the captured animals accumulate. Fishing trawls are typically very non-specific in the capture of animals, that is, they capture many un-wanted species. These unwanted species are referred to as "bycatch" or in some cases "bykill". Estimates range from 7.3 to 39.5 million tons of bycatch discarded into the oceans world wide. Shrimp and bottom fish trawls have been estimated to account for over 50% of the total. In the U.S. Gulf of Mexico shrimp fishery, the ratio of bycatch to shrimp is 4.56, that is, 4.56 pounds of fish are captured and discarded for every pound of shrimp.

The vast majority of bycatch species are discarded either dead or dying. Estimates suggest that 90+% of bycatch species are dead when discarded. The effect of the introduction of large numbers of dead and dying organisms into the marine environment is unknown but likely detrimental to the ecosystem.

Commercial fishing is an important source of revenue for many coastal communities and provides an important source of protein in many parts of the world. Considering that many fisheries are on the decline worldwide, the need for sustainable fishing practices is more important today than ever before. Sustainable fishing must include fishing techniques that are more efficient at capturing the target species. In some cases, commercial fishing activities are limited based upon the capture of the targeted species (quotas) and in some cases may be based on bycatch of non-target species. In some U.S. fisheries, commercial fishing is not possible or profitable during certain times of the year or in certain areas because of the presence of large numbers of bycatch species. Large amounts of bycatch require the fisher to spend excess time sorting target from non-target species and limits the time spent in actual fishing. A device that reduces bycatch during trawl fishing is good for the environment, good for the commercial fisher, and good for the economy. In a world of declining fish stocks, it is imperative that fishers use every weapon in their arsenal to reduce or eliminate the catch of unwanted species.

A variety of devices have been developed for reducing bycatch of species during trawl fishing. Several devices have been proposed for the reduction of sea turtle bycatch during shrimp trawling. U.S. Pat. No. 4,739,574, from 1988 describes a device that excludes sea turtle bycatch during trawling. The device consists of a grid with sufficient spacing to allow small species (such as shrimp) to pass into the trawl bag but large species such as sea turtles, to be directed to an escape opening. The turtle excluder device is placed in the trawl body in front of the trawl bag or cod end. U.S. Pat. No. 5,076,000 from 1991 describes a weedless turtle excluder device. Additionally, U.S. Pat. No. 5,222,318 from June 1993 describes a turtle exclusion grate having bowed vertical bars and an overhang at its base. An apparatus for exclusion of debris and bycatch from bottom trawls is described in U.S. Pat. No. 5,575,102 from November 1996. That patent describes a grid-type turtle and debris excluder device employing a spoiler plate that directs the flow of water into the excluder grid and creates a water curtain.

In addition to turtle excluder devices, various inventions have been designed for use in shrimp and bottom trawls that are purported to separate targeted species from unwanted species. For example, U.S. Pat. No. 3,195,261 from 1965 describes a spiller device for trawl nets that allows fish to escape when the trawl bag becomes overloaded. U.S. Pat. No. 3,440,752 from April 1969 regards a bycatch reduction device that employees a grill positioned within the trawl bag that separates marine species by size. A pump and a pumping tube allow the desired species to be pumped to the fishing vessel. U.S. Pat. No. 4,805,335 from February 1989 describes a sorting device for trawls that assumes a funnel configuration at the bottom of the trawl and allows shellfish to escape while retaining fin-fish. An apparatus for exclusion of debris from bottom trawls, described in U.S. Pat. No. 4,869,010 from September 1989, is an array of angled, spaced bars (a grid) placed immediately ahead of the trawl bag. The grid allows shrimp to pass while fish are forced to the outside of the trawl. U.S. Pat. No. 5,123,195 from June 1992 describes a system to separate marine shrimp from debris and unwanted species. The system employs a separate net, piggy-backed upon the main net. A sonic pulser is used to stimulate shrimp to enter the upper net while debris and unwanted fish pass out of the back of the trawl. U.S. Pat. No. 5,215,197 from June 1993 sorts trawl captured marine species on the fishing vessel using several sorting screens arranged vertically such that the screens, from top to bottom, have progressively smaller openings. The largest organisms are retained on the first screen while smaller ones pass through. U.S. Pat. No. 5,325,619 from July 1994 describes a fishing trawl device that uses an outer net of a certain mesh size and an inner net of smaller mesh size to sort species and debris by size. U.S. Pat. No. 6,223,462, from 2001 describes a device that is a venturi-type narrowing of the trawl just ahead of the trawl bag. The device has an outslip unit with a number of grid frames attached to each other that allows escape of fish below a certain size but retains fish too large to pass through the grid.

In most of the above described devices, separation of target from non-target species is brought about by size sorting. Grids or screens are used to retain large species while smaller one are not retained. This may be effective for reducing bycatch when target and non-target species are of significantly different sizes. However, in many (most?) shrimp trawl fisheries, the target species (shrimp) are not significantly different in size from bycatch (small fish) such that size sorting is not effective for reducing bycatch. The device described herein takes advantage of fundamental differences between shrimp (target species) and fish (non-target species) behavior and uses these differences to separate them during trawling.

BRIEF SUMMARY OF THE INVENTION

The device described herein is a simple invention for elimination of a large proportion of unwanted, non-targeted, bycatch species from fishing trawls.

The device incorporates a cylinder that is nested inside of another cylinder to create a continuous escape opening around the entire circumference of the trawl. Flow blocking panels create slack water downstream of the panels and in the vicinity of the escape opening that encourage fish to move into the escape opening and out of the trawl. The device is placed in the body of the trawl just ahead of the trawl bag.

The device has been shown to reduce bycatch in Gulf of Mexico shrimp trawling by 50% on average.

DETAILED DESCRIPTION OF THE INVENTION

Figure 1:
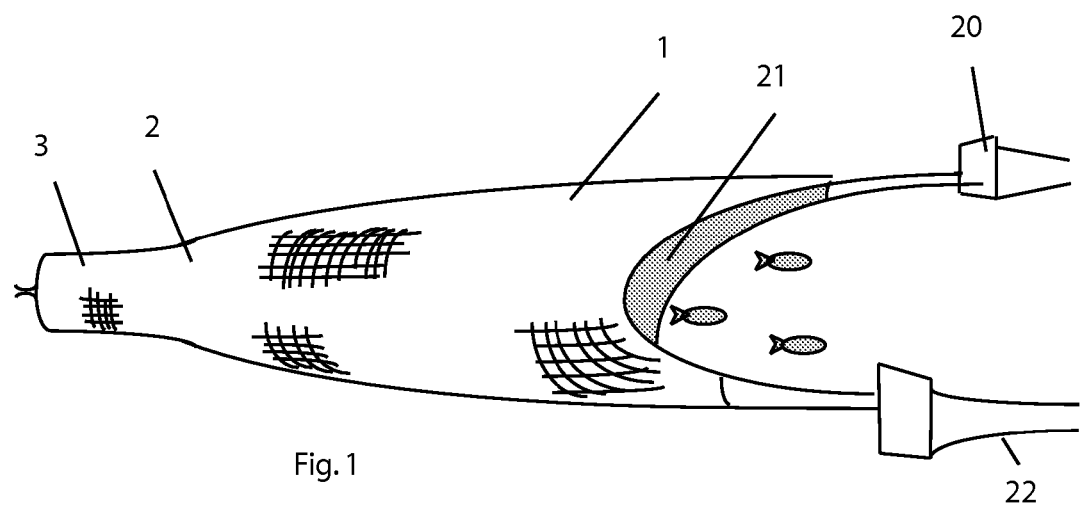
FIG. 1 shows a fishing trawl (1). The trawl is pulled through the water, its large front opening (21) is held open by two trawl doors (20) that are connected to the fishing vessel via cables (22). Target species are captured in the large front opening and are funneled into the trawl bag or cod end (3). The device described herein is placed in a position (2) in the trawl just ahead of the trawl bag (3).

FIG. 1 shows prior art of a typical trawl (1) consisting of cables (22) that attaches the trawl to the fishing vessel, trawl doors (20) that keep the trawl open, the large, forward directing opening of the trawl (21), and a trawl cod end or bag (3). The invention described herein constitutes a new invention that is placed in the trawl just ahead of the trawl bag (2) and behind the turtle excluder device (not shown in the drawing) when/if a turtle excluder device is present. The trawl is pulled through the water along the ocean bottom and captures any organism that is unable to get out of the way. The captured organisms accumulate in the trawl bag (3).

Figure 2:
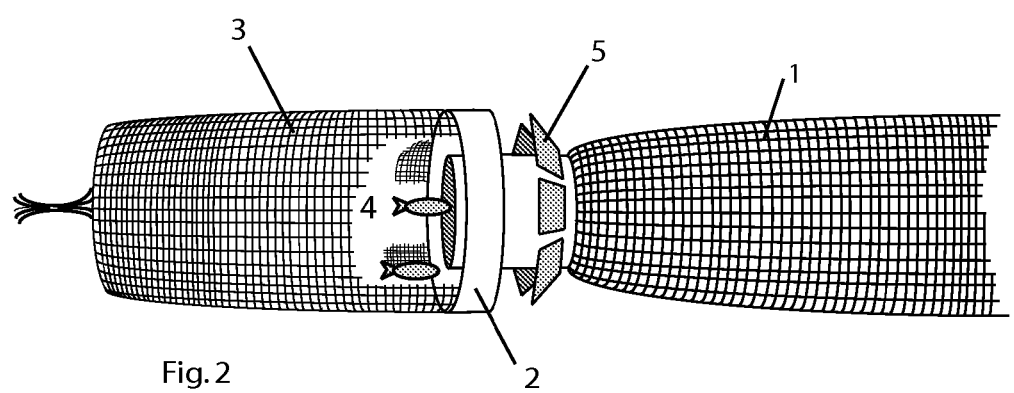
FIG. 2 shows a close-up of the invention in side view. The device (2) is sewn into the trawl ahead of the trawl bag (3) and behind the trawl body (1). The flow blocking panels (5) create reduced flow in the vicinity of the escape exit. The area inside the trawl bag (4) is shown.

FIG. 2 shows the invention described herein, as it would appear inserted into a fishing trawl. The invention is inserted into the existing trawl netting by sewing the trawl bag (3) onto the outer, larger cylinder (2) and the forward portion of the trawl (1) is sewn onto the inner, smaller cylinder of the invention. Flow blocking plates (5) are either welded or bolted to the inner cylinder. A cut-away view of the inside of the trawl bag (4) shows fish interacting with the invention.

Figure 3:
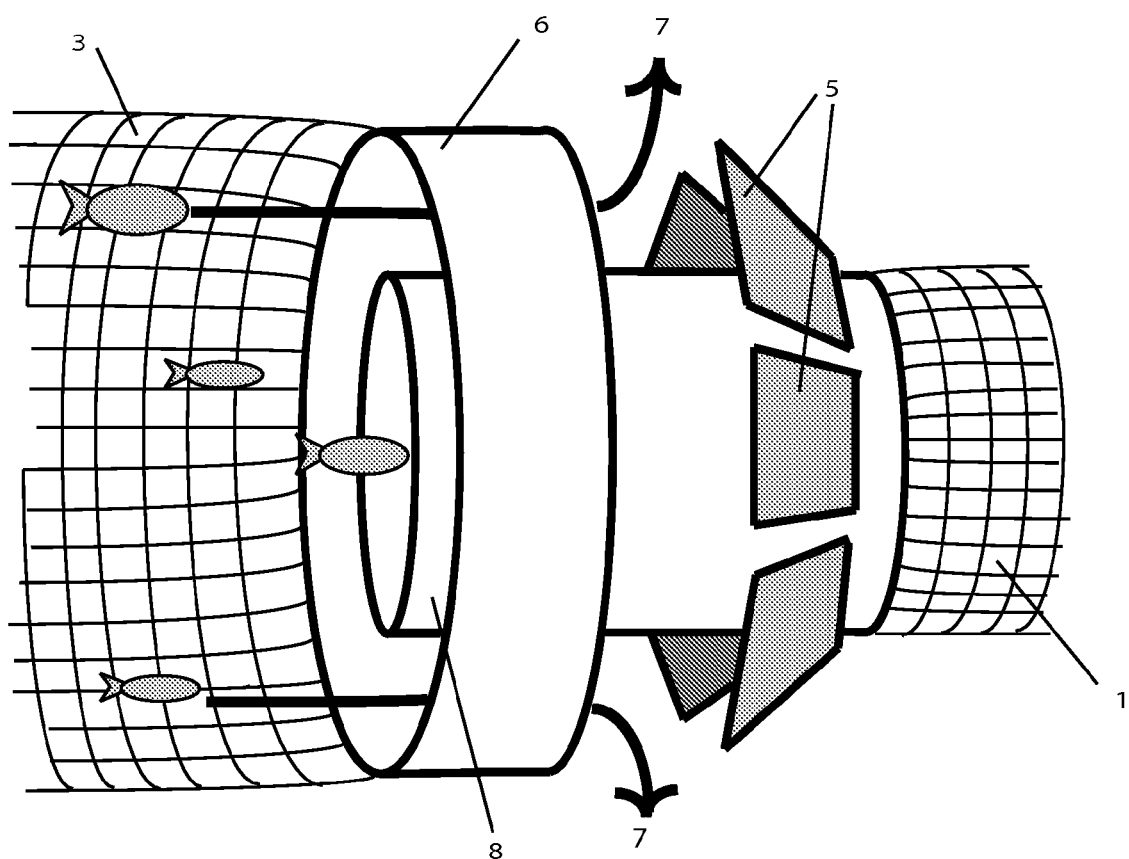
FIG. 3 shows a close-up of the device showing the trawl bag (3), the trawl body (1) and arrangement of the flow blocking panels (5). The escape opening is created by the arrangement of the smaller diameter, longer cylinder (8) nested inside of a shorter, larger diameter cylinder (6). The path for bycatch escape (7) through the exit opening is shown.

FIG. 3 shows a close-up of the invention. The forward portion of the trawl (1) is attached to the upstream end of the inner cylinder (8) and the trawl bag (3) is attached to the down stream end of the outer cylinder (6). The trawl netting is sewn or lashed onto the cylinders using heavy cordage through holes drilled along the edge of the cylinders. The inner and outer cylinders are fabricated from heavy gauge PVC, stainless steel or aluminum. Flow blocking plates (5) are attached close to the upstream end of the smaller cylinder. The plates (5) are set at a 45° angle and arranged around the periphery of the upstream end of the smaller cylinder (8) set back about 1 inch from the cylinder end. The plates are approximately 8 inches wide and 5.25 inches long and are bolted or welded to the upstream end of the cylinder. The plates are fabricated of stock PVC, stainless steel or aluminum. The plates extend out away from the cylinder such that their distal end terminates on the same horizontal plane as the outer cylinder (6). These plates block water flow and create a reduction in the speed of the water current downstream. This reduction in water flow has been found to encourage fish to move into this area (7) and escape from the trawl.

Figure 4:
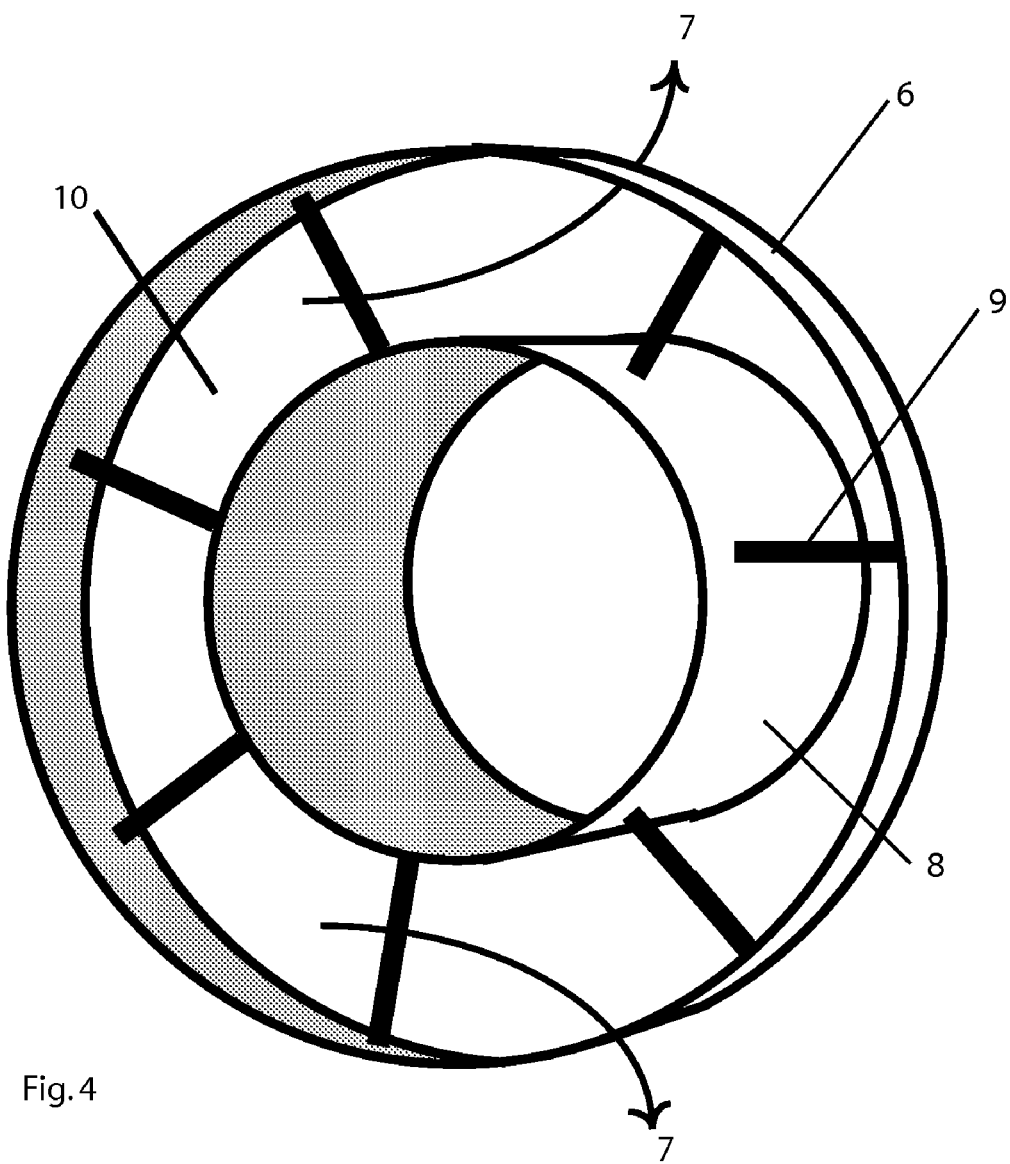
FIG. 4 shows a detail of the device showing the attachments (9) of the inner cylinder (8) to the outer cylinder (6). The exit opening (10) formed by the arrangement of the two cylinders and the path for bycatch escape (7) are shown.

FIG. 4 shows a close-up of the invention, viewed from the downstream end of the device. The arrangement of the inner cylinder (8) and outer cylinder (6) creates a continuous escape opening (10) around the circumference of the net. The smaller inner cylinder (8) is attached to the larger, outer one (6) with large bolts (9) or via welded stainless steel or aluminum braces. The path for the escape of fish is also indicated (7).

Figure 5:
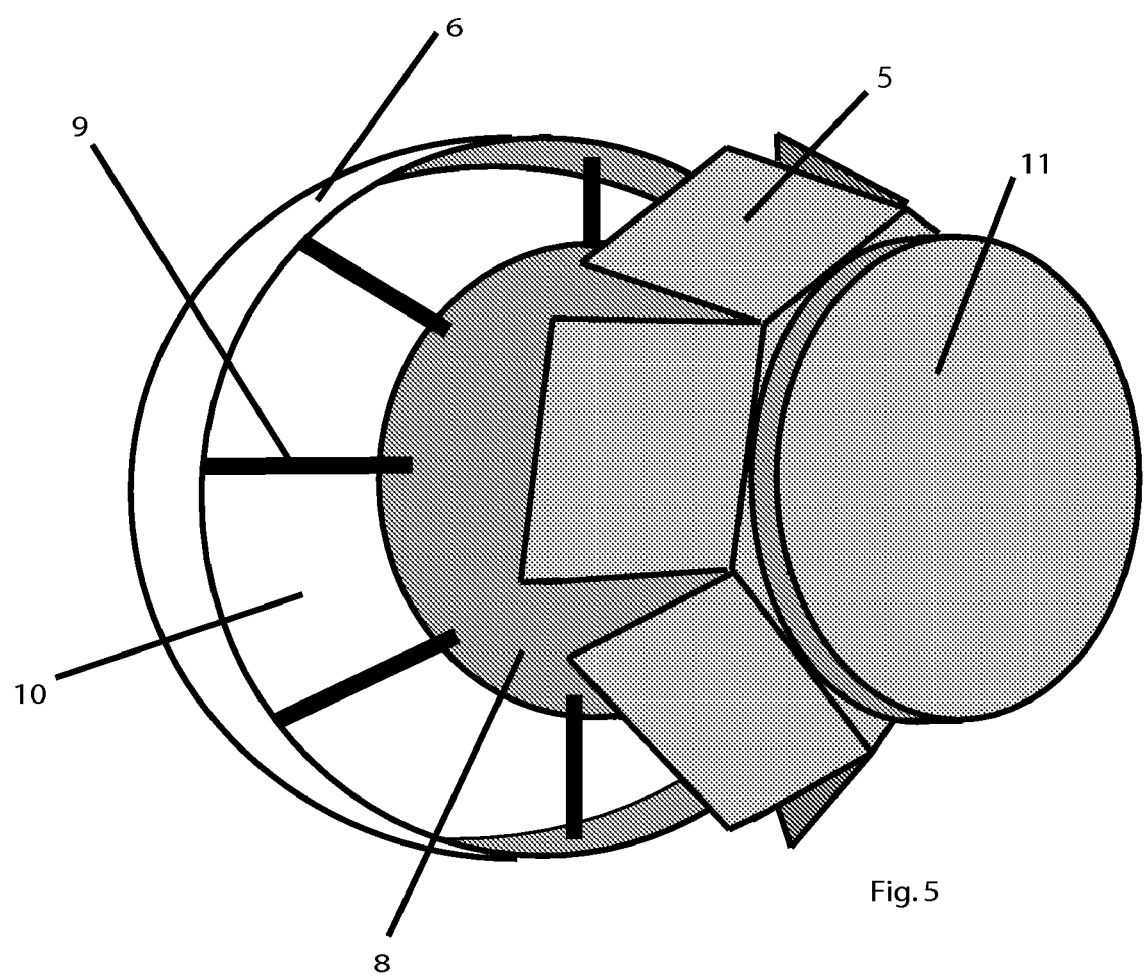
FIG. 5 shows the device viewed from the upstream end (11). A close-up of the flow blocking panels (5) and their attachment to the inner cylinder (8) is shown. The attachments (9) that connect the inner (8) and outer cylinders (6) and the exit opening (10) are shown.

FIG. 5 shows a close-up of the invention viewed from the upstream end (11) of the device. The flow blocking plates (5) are attached to the upstream end of the inner cylinder (8) and may be welded or bolted. The larger outer cylinder (6) is attached to the downstream end of the inner cylinder using supports (9) to create the escape channel (10).

The invention described herein takes advantage of differences in swimming ability and/or behavior between target species (shrimp) and non-target species (fish). Fish, enter the device at the upstream end (11) and are carried by water current to the downstream end of the inner cylinder (8) whereupon they sense the reduced flow created by the flow plates (5). Flow blocking plates (5) encourage fish to swim forward in the device to take up position in the slower water flow behind the plates. Their movement into this area permits them to move through the exit and out of the trawl. Shrimp are weak swimmers and less "directional" in their swimming behavior and are therefore unable to move into the slower flow area. Shrimp pass through the device and into the trawl bag.

DECLARATION

I Glenn R. Parsons, U.S. Citizen, residing at 467 Highway 7 North, Oxford, Miss. declare that I am the original and first inventor of the device described in this patent application.

What is claimed is:

1. A device for reducing the catch of unwanted species for being placed in trawl nets comprising:
   a) a first cylinder having an open upstream end, an open downstream end, a first length defined between said upstream and downstream ends thereof, and a first diameter;
   b) a second cylinder having an open upstream end, an open downstream end, a second length defined between said upstream and downstream ends thereof, and a second diameter;
   c) said first diameter being less than said second diameter, and said first length being longer than said second length;
   d) said cylinders being connected to each other such that said cylinders are concentric with said first cylinder being positioned at least partially within said second cylinder so as to at least partially overlap and define an escape opening between said first and second cylinders, said cylinders being connected to each other by attachments extending radially between said cylinders, said attachments being spaced from each other and arranged around said outer circumference of said first cylinder, first ends of said attachments being attached to said outer circumference of said first cylinder at said downstream end of said first cylinder and second ends of said attachments being attached to an inner circumference of said second diameter; and
   e) flow blocking plates, said flow blocking plates each having a first end, a second end, a width, and a length defined between said first and second ends, said flow blocking plates connected to said first cylinder by said first, ends of said flow blocking plates being attached to said outer circumference of said first cylinder at said upstream end of said first cylinder, said flow blocking plates being spaced from each other and arranged around said outer circumference of said first cylinder, said second ends being spaced from said outer circumference of said first cylinder and located between said first ends of said flow blocking plates and said downstream end of said first cylinder, each of said flow blocking plates extending at an angle relative to a longitudinal axis of said first cylinder.

2. The device for reducing the catch of unwanted species in trawl nets according to claim 1,
   wherein when the device is placed in the trawl net:
   a) a trawl bag or cod end is attached to the second cylinder on the downstream end of the second cylinder; and
   b) a forward portion of the trawl is attached on the upstream end of the first cylinder.

3. The device for reducing the catch of unwanted species in trawl nets according to claim 1,
   wherein the flow blocking plates arranged around said outer circumference of the upstream end of the first cylinder create an area of reduced water flow:
   a) with said reduced flow being created in a vicinity of and just ahead of the escape opening; and
   b) said reduced water flow inducing fish to move into the vicinity of the escape opening and then out of the trawl.

4. The device for reducing the catch of unwanted species in trawl nets according to claim 1, wherein said first and second cylinders are connected to each other by being bolted or welded together.

5. The device for reducing the catch of unwanted species in trawl nets according to claim 1, wherein said flow blocking plates are connected to said upstream end of said first cylinder by being bolted or welded together.

6. The device for reducing the catch of unwanted species in trawl nets according to claim 1, wherein said first and second cylinders comprise heavy gauge PVC, stainless steel, or aluminum.

7. The device for reducing the catch of unwanted species in trawl nets according to claim 1, wherein said flow blocking plates comprise stock PVC, stainless steel, or aluminum.

8. The device for reducing the catch of unwanted species in trawl nets according to claim 1, wherein said device further comprises:
   said first cylinder having said first diameter of approximately 20 inches and said first length of approximately 15 to 27 inches; and
   said second cylinder having said second diameter of approximately 32 inches and said second length of approximately 4.5 inches.

9. The device for reducing the catch of unwanted species in trawl nets according to claim 1, wherein said device further comprises:
   said flow blocking plates having said width of approximately 8 inches and said length of approximately 5.25 inches.

10. The device for reducing the catch of unwanted species in trawl nets according to claim 1, wherein said device further comprises:
    each of said flow blocking plates extending in said plane which is at an approximately 45° angle relative to a longitudinal axis of said first cylinder.

* * * * *